United States Patent [19]
Schrott et al.

[11] Patent Number: 4,740,052
[45] Date of Patent: Apr. 26, 1988

[54] CONNECTOR FOR OPTICAL FIBER

[75] Inventors: Werner G. Schrott; Klaus Maaz, both of Heilbronn, Fed. Rep. of Germany

[73] Assignee: Amphenol Corporation, Wallingford, Conn.

[21] Appl. No.: 371,795

[22] Filed: Apr. 26, 1982

[30] Foreign Application Priority Data

May 9, 1981 [DE] Fed. Rep. of Germany ....... 3118489

[51] Int. Cl.⁴ .............................................. G02B 6/38
[52] U.S. Cl. .................................................. 350/96.21
[58] Field of Search ..................................... 350/96.21

[56] References Cited
U.S. PATENT DOCUMENTS

| 3,861,781 | 1/1975 | Hasegawa | 350/96 C |
| 4,107,242 | 8/1978 | Runge | 264/1 |
| 4,173,389 | 11/1979 | Curtis | 350/96.20 |
| 4,186,999 | 2/1980 | Harwood et al. | 350/96.21 |
| 4,240,695 | 12/1980 | Evans | 350/96.21 |
| 4,264,128 | 4/1981 | Young | 350/96.20 |

FOREIGN PATENT DOCUMENTS 0031451   7/1981   European Pat. Off. .
1458896   12/1976   United Kingdom .

OTHER PUBLICATIONS

McGrew-Hill Encyclopedia of Science & Technology; pp. 529-534; 1984.

Primary Examiner—William L. Sikes
Assistant Examiner—Robert E. Wise
Attorney, Agent, or Firm—Bacon & Thomas

[57] ABSTRACT

The invention relates to a connector for permanent attachment to an optical fiber, as well as to a method for the production of the connector and various types of adapters for mating with the connector. Specifically, the invention relates to a plug-in connector for attachment to an end of a light conducting cable including an optical fiber surrounded by a sheathing. The connector is preferably formed of a plastic material cast around the cable and holding the optical fiber in the center of the connector. The connector is formed as a plug-in connector to be used where the information transmission occurs at a comparatively low tolerance level and is formed from a one-piece, injection moulded plastic part. The connector is injection moulded around the fiber while the fiber is centrally held in an injection-moulding die and projects out from the sheathing. The connector extends over a part of the sheathing which is joined to it by moulding. The invention is also concerned with a coupling into which two of the above-described connectors can be inserted and various adapters which engage with the connector.

13 Claims, 1 Drawing Sheet

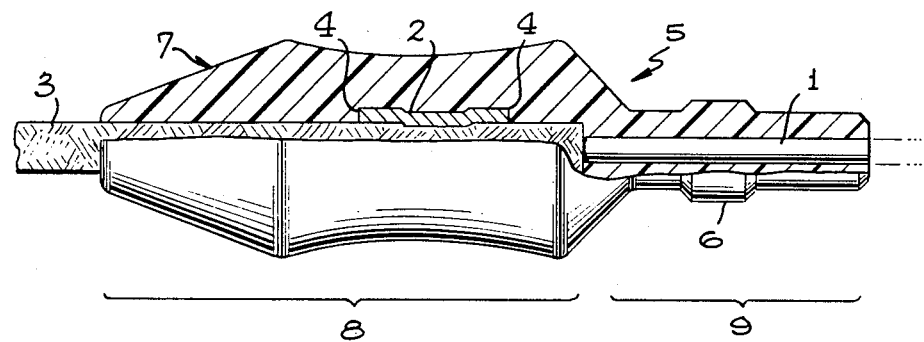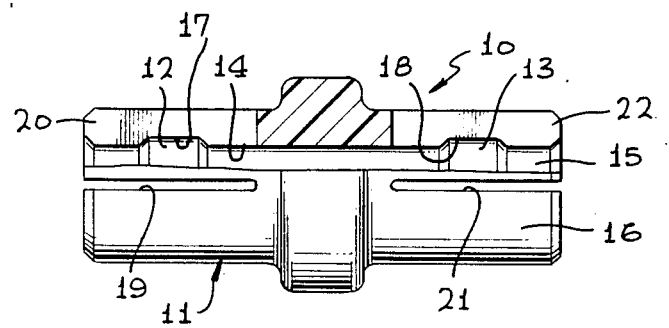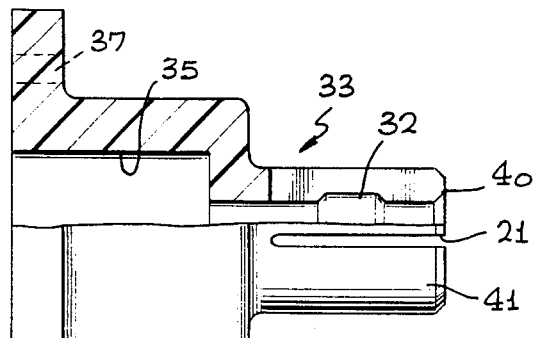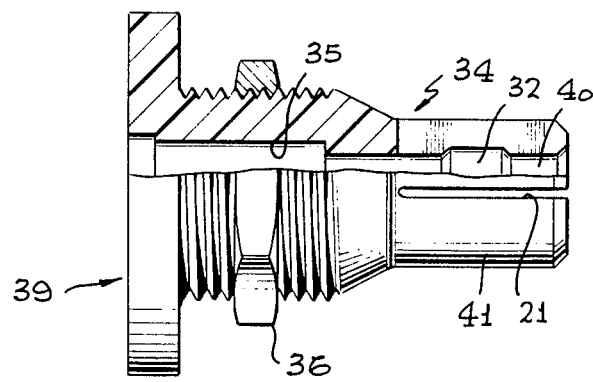

CONNECTOR FOR OPTICAL FIBER

TECHNICAL FIELD

This invention relates to a connector for permanent attachment to an optical fiber, as well as to a method for the production of the connector and various types of adapters for mating with the conductor. Specifically, the invention relates to a plug-in connector for attachment to an end of a light conducting cable including an optical fiber surrounded by a sheathing. The connector is preferably formed of a plastic material cast around the cable and holding the optical fiber in the center of the connector.

BACKGROUND OF THE PRIOR ART

From German Patent No. DE-PS 23 52 874 (Nippon Electric Co.), a light conductor connection is known in which a connector body is heated in order to soften the connector body and allow it to fuse to the thermoplastic sheathing of the optical fiber inserted into the connector body. With this prior art connector, the light conductor is inserted into the connector body, through a passageway with a small cross-section, until a certain length of the conductor projects out past the end surface of the connector body. After cooling, the thermoplastic sheathing solidifies and forms a secure and stable mechanical connection between the sheathing and the connector body. Then, the cavity provided on the end surface of the connector body must be filled out with a mass so that the end of the fiber is securely held in position in the connector body.

German Patent No. DE-PS 24 24 846 (a patent of addition to the above-mentioned patent) discloses a guide bushing which is employed as a thermal insulator for the light conductor to prevent damage to the optical fiber during the heating and insertion operations. The prior art connector relies on the use of a binding and tightening mass, for example an epoxy resin, which is poured around the optical fiber to hold it securely and stably in the connector.

BRIEF SUMMARY OF THE INVENTION

It is the intention of the present invention to form a connector in such a way that it can be produced cheaply and in a simple manner. Particularly, the connector is formed as a plug-in connector to be used where the information transmission occurs at a comparatively low tolerance level. This is the case, for example, in the control of high voltage systems, in which just the information "short circuit yes" or "short circuit no" is to be transmitted. Other applications are also possible, in which the required speed or bandwith of the system is insignificant. Usage is also possible in high-quality toys, e.g., in toy electronics kits. The plug-in connector can also be used in the amateur construction field or by experimentors very easily.

In order to avoid a complicated construction scheme for assembling a connector consisting of several parts, the invention provides a connector formed from a one-piece, injection-moulded plastic part. The connector is injection-moulded around the fiber while the fiber is centrally held in an injection-moulding die and projects out from the sheathing. The connector extends over a part of the sheathing which is joined to it by moulding. In this way the invention eliminates the use of a pre-formed connector body which must be heated to fuse it to the sheathed fiber.

The invention is also concerned with a coupling into which two of the above-described connectors can be inserted and various adapters which engage with the connector.

BRIEF DESCRIPTION OF THE DRAWINGS

Further advantages and details of the invention will become apparent from the following detailed description, taken in conjunction with the accompanying drawings, in which:

FIG. 1 is a sectional view of a plug-in connector formed according to the invention;

FIG. 2 is a sectional view of a coupling formed according to the invention;

FIG. 3 is a sectional view of an adapter according to the invention; and

FIG. 4 is a sectional view of a further embodiment of an adapter according to the invention.

DETAILED DESCRIPTION OF THE PREFERRED EMBODIMENTS

The connector shown in FIG. 1 as a plug-in connector is used for terminating a light conducting cable which consists of an optical fiber 1 inside of a sheathing 3. Prior to attaching the connector to the cable, the sheathing is removed from an end portion of the cable. The plug-in connector 5 consists of one-piece, is plastic, and is preferably injection-moulded around exposed optical fiber 1 as well as sheathing 3. During the injection moulding, the optical fiber 1, (which is preferably a plastic fiber having a diameter of approximately 500 microns) is held centered in the injection-moulding die. This method of production is extremely cost-effective. The injection-moulding method can cause softening of the plastic fiber. Accordingly, care should be taken to avoid this result, possibly with the use of PVC. Following the injection-moulding process, that portion of the fiber which projects outside of the connector body (as shown by the dashed lines in FIG. 1) is cut off using a commercial cutting device. As a cutting device, the Automatic Terminator Tool of Fibre Link Company, may be used. The cut end will have an optical quality.

The one-piece, plastic, injection-moulded part 7 essentially consists of a handle 8 and a male contact portion 9. Handle 8 facilitates the holding of the plug-in connector 5. The contact portion is comprised of a locking element in the form of a locking bead 6. The locking bead 6 may be brought into engagement with a coupling 10 (FIG. 2), as well as one of the adapters 33 and 34 (FIGS. 3 and 4). The outer diameter of locking element 9 is smaller than the outer diameter of the handle 8. Locking bead 6 is used for the exact positioning of the plug-in connector 5 in coupling 10 or in adapters 33 and 34.

A strain relief in the form of a strain relief element 2 is fixed to the sheathing 3 and is also surrounded by the injection-moulded plastic part 7. The strain relief element 2 is attached to the sheathing 3 by glueing or crimping. As shown in FIG. 1, a brass bushing 2 is crimped around plastic sheathing 3. As the plastic, injection-moulded part 7 surrounds the bushing 2, it is held in place by the action of ends 54 of bushing 2 engaging confrontive surfaces of moulded part 7.

Shown in FIG. 2 is coupling 10. Coupling 10 is comprised of body 11 in which a cylindrical bore 14 is provided. Snap-lock rings 12 and 13 are formed opposite each other on body 11 and define inside cavities 17 and 18 for receiving the locking beads 6 of plug-in connectors 5. The design of coupling 10 accommodates the insertion of two male contact portions 9 at the opposing ends of bore 14. By inserting the two contact portions 9 as described, the respective ends of the optical fibers will abut each other and centrally of coupling 10.

Snap-lock connections 12 and 13 and body 11 are separated into four arcuate segments (two of which are shown in FIG. 2 and designated as 15 and 16) by means of crosswise slits 19, 20, 21 and 22.

FIGS. 3 and 4 show respectively adapters 33 and 34. Adapter 33 can be connected to a body by the use of screws or other fastening means inserted through four openings, (two of which are identified in FIG. 3 by numerals 37 and 38). Adapter 34 may likewise be fastened to a body by insertion of end 39 through an opening in the body and subsequently tightening nut 36 against that body.

Similar to the coupling 10, snap-lock connections 32 are provided at the ends of adapters 33 and 34 by crosswise slits 21 forming four arcuate segments, two of which are shown as 40 and 41. These segments provide the resiliency for snap-lock connections 32. Recess 35 defined in the bodies of couplings 33 and 34 may be used to house a transmitter or receiver.

Instead of the injection-moulding method being used to form the connector 5, a casting method may be used. This method involves the use of a casting resin such as, for example, an epoxy resin.

PCS or glass rather than plastic may be used for the optical fiber. However, if a plastic material is used, Polyacryl should be considered.

We claim:

1. A connector system for permanent attachment to an optical fiber, said connector system comprising:
a single-piece body; and at least one partially sheathed optical fiber, said fiber extending longitudinally through said body such that said sheathed portion of said fiber forms a first longitudinal length and the exposed portion of said fiber forms a second longitudinal length, said first and second longitudinal lengths being surrounded by and in intimate direct contact with said body, said body being integrally moulded about said fiber, said body comprising a first portion and a second portion, said first portion intimately surrounding substantially the full length of said first length of fiber, said second portion intimately surrounding substantially the full length of said second length of fiber and having a smaller diameter than said first portion, and a circumferential locking bead provided on said second portion of said body and having a larger diameter than said second portion.

2. A connector according to claim 1 wherein said body is injection moulded.

3. A connector according to claim 1 wherein said body is cast moulded.

4. A connector according to claim 1 wherein said fiber is made from plastic.

5. A connector according to claim 1 wherein said sheathing extends longitudinally through said first portion of said body and said fiber extends longitudinally through said sheathing in said first portion and continues beyond said sheathing through said second portion of said body.

6. A connector according to claim 1 wherein a strain relief element is located on said sheathing between said sheathing and said body.

7. A connector according to claim 1 wherein said body is formed from a molding epoxy resin.

8. A connector according to claim 1 wherein said first portion of said body has an exterior shape defined by a reaward conical section and a forward convex section, thereby providing a handle for said connector.

9. The connector of claim 8 wherein said second portion of said body includes a conical section extending forwardly of said convex section, said locking bead being located forwardly of said conical section of said second portion.

10. A method of producing a single piece connector comprising:
partially exposing a sheathed optical fiber having two ends by complete removal of said sheathing along a first length beginning at one end of said fiber;
placing longitudinally within a connector die said partially exposed optical fiber such that the exposed end of said fiber extends beyond that end of the die which forms that portion of a connector used for engagement with a corresponding body, filling the die with the material which forms the body of the connector;
removing the die; and
clipping off all exposed fiber which extends outside of the connector body.

11. A method according to claim 10 wherein a strain relief element is fastened to the sheathing prior to forming the connector body.

12. A method according to claim 10 wherein the material introduced into the die is a plastic.

13. A method according to claim 10 wherein the material introduced into the die is a cast epoxy resin.

* * * * *